(12) United States Patent
Wilinski

(10) Patent No.: US 11,778,081 B2
(45) Date of Patent: Oct. 3, 2023

(54) ELECTRONIC DEVICE HOLDER

(71) Applicant: Sean Wilinski, Winchester, VA (US)

(72) Inventor: Sean Wilinski, Winchester, VA (US)

(*) Notice: Subject to any disclaimer, the term of this patent is extended or adjusted under 35 U.S.C. 154(b) by 389 days.

(21) Appl. No.: 17/228,144

(22) Filed: Apr. 12, 2021

(65) Prior Publication Data

US 2022/0247851 A1    Aug. 4, 2022

Related U.S. Application Data

(60) Provisional application No. 63/144,831, filed on Feb. 2, 2021.

(51) Int. Cl.
| | | |
|---|---|---|
| *H04M 1/00* | (2006.01) | |
| *H04M 1/06* | (2006.01) | |
| *H02J 7/00* | (2006.01) | |

(52) U.S. Cl.
CPC ............. *H04M 1/06* (2013.01); *H02J 7/0042* (2013.01)

(58) Field of Classification Search
CPC ...................................................... H04M 1/06
See application file for complete search history.

(56) References Cited

U.S. PATENT DOCUMENTS

| | | | | |
|---|---|---|---|---|
| 2006/0121953 A1* | 6/2006 | Park | ............... | H02J 7/0044 455/573 |
| 2012/0001048 A1* | 1/2012 | Takahashi | ............... | H04M 1/04 248/346.03 |
| 2013/0270413 A1* | 10/2013 | Wilber | ............... | F16M 11/00 248/558 |
| 2014/0216954 A1* | 8/2014 | Law | ............... | H05K 5/0226 206/45.23 |
| 2016/0020806 A1* | 1/2016 | Richter | ............... | H04M 1/04 455/557 |
| 2017/0219159 A1* | 8/2017 | Wiebush, III | ............... | H04M 1/04 |
| 2017/0230489 A1* | 8/2017 | Date | ............... | F16M 11/041 |
| 2019/0018452 A1* | 1/2019 | Caron | ............... | G06F 1/1632 |
| 2020/0124227 A1* | 4/2020 | Fine | ............... | H04M 1/04 |
| 2021/0211533 A1* | 7/2021 | Kingsland | ............... | H04M 1/04 |
| 2021/0240058 A1* | 8/2021 | Lee | ............... | F16M 11/041 |
| 2022/0078273 A1* | 3/2022 | Naylor-Warren | ....... | H04M 1/04 |
| 2022/0150341 A1* | 5/2022 | Linden | ............... | F16M 11/22 |

* cited by examiner

*Primary Examiner* — Simon King
(74) *Attorney, Agent, or Firm* — Brennan, Manna & Diamond, LLC

(57) ABSTRACT

A phone stand designed to hold a tablet, smartphone or an e-reader in an easily viewable position. The stand includes a single body of wood, metal or plastic, and is comprised of a taller rear wall, a pair of parallel side surfaces and two front legs forming the front portion; each front leg has a plurality of angular holding slots cut at different angles to support the smartphone; an inclined middle portion to support the rear surface of the smartphone; and a longitudinal support surface taller than the inclined middle portion and equal in height to the rear wall to further support the rear surface of the smartphone. To place a phone in a longitudinal of landscape orientation, a first placement space is placed between the rear wall and the longitudinal support surface and a second placement space is placed between the support surface and the inclined middle portion.

20 Claims, 3 Drawing Sheets

ELECTRONIC DEVICE HOLDER

CROSS-REFERENCE TO RELATED APPLICATION

The present application claims priority to, and the benefit of, U.S. Provisional Application No. 63/144,831, which was filed on Feb. 2, 2021 and is incorporated herein by reference in its entirety.

FIELD OF THE INVENTION

The present invention relates generally to the field of phone accessories. More specifically, the present invention relates to a stand or a support structure for a mobile phone, or electronic device, designed to keep the phone at an ideal angle for hands-free viewing. The support structure features multiple retention slots that enable the user to adjust a mounted angle of the mobile phone device. The uniquely designed support structure enables users to video conference with others, multitask while using video chatting, generally view and use the phone, and more, without manually holding the phone. Accordingly, the present disclosure makes specific reference thereto. Nonetheless, it is to be appreciated that aspects of the present invention are also equally applicable to other like applications, devices and methods of manufacture.

BACKGROUND OF THE INVENTION

By way of background, mobile phones, or other portable electronic devices, are used by people around the world for a variety of purposes such as for communicating with people living remotely, for conducting business, for video chatting, for surfing the internet and much more. To use a mobile phone, a user typically needs to hold the phone in his or her hand at a viewable angle and then use the phone for the required purposes. When the phone is not in use, most users keep their phone flat on a table or a desk. However, when a person needs to check notifications, emails, etc., the person has to constantly pick up his or her phone from the table or desk and then hold the phone at a viewable angle. It is usually difficult to keep the home screen at a viewable angle when the phone is placed flat on the desk or table. Therefore, every time the user needs to check and/or use the phone, it needs picked up from the desk or table surface.

Additionally, while using the phone for video chatting or video conferencing, a user must be vigilant to maintain the phone at a viewable angle to allow the user to easily view the phone screen and connect with others. Also, the camera of the phone should be kept centered on the user, such that the user can be properly viewed by others while video chatting or video conferencing with others. For the above scenarios, a user must constantly adjust the angle, distance, and orientation between the phone screen and the user. However, when the user is holding the phone, it interferes with the ability to perform other tasks. Multi-tasking is generally prohibited while users are holding the phone. Also, holding the phone in one's hands at a particular angle may be tiring and frustrating for the user. Further, for people with limited physical dexterity, it may be quite difficult to hold and use the phone continuously. Elderly individuals typically find that constant attention to the phone's angle and distance during use can be tiresome. Furthermore, people face problems in using the phone while the phone is plugged into a power outlet for charging.

Therefore, there exists a long felt need in the art for a support structure for holding phones in a stationary position. There is also a long felt need in the art for a support structure that enables the mobile phone to be kept at a desired angle while using the phone. Additionally, there is a long felt need in the art for a phone stand that eliminates the need for users to hold their phones while using the phone for various purposes such as video chatting, video conferencing, internet surfing or other purposes. Moreover, there is a long felt need in the art for a phone support structure that keeps the phone at an angle which facilitates centering the camera on the user, thereby enabling the user to be easily viewed by others while video conferencing or video chatting. Further, there is a long felt need in the art for a support structure that can retain a phone in a fixed position, thereby eliminating the need to manually hold the phone for any length of time. Furthermore, there is a long felt need in the art for a phone stand that makes it easy for elderly individuals and individuals with limited dexterity to use their phones. There is a long felt need in the art for a phone support structure that allows users to easily use their phones for different purposes while the phone is plugged in for charging. Finally, there is a long felt need in the art for a phone support structure that enables the phone to be retained on a mounted structure, thereby allowing multitasking as required.

The subject matter disclosed and claimed herein, in one embodiment thereof, comprises a phone "throne" or stand designed to hold a tablet or smart phone in an easily viewable position comprising: a one-piece body of wood, metal or plastic having a taller rear portion including a rear wall; a pair of parallel surfaces and two front legs, wherein each front leg has a plurality of angular holding slots cut at different angles to support the smartphone; an inclined middle portion to support a rear surface or rear side of the smartphone; and a longitudinal support surface taller than the inclined middle portion and similar in height to the rear wall to further support the rear surface of the smartphone. A first placement space is positioned between the rear wall and the longitudinal support surface and a second placement space is positioned between the longitudinal support surface and the inclined middle portion. The first and second placements spaces are present to hold the tablet or the smartphone along one of the longitudinal side surfaces of the tablet or the smartphone (i.e. in landscape orientation).

In this manner, the novel phone support structure of the present invention accomplishes all of the forgoing objectives, and provides a relatively easy, convenient and efficient solution for holding mobile phones at a specific viewable angle while using the phone for different purposes. The phone support structure of the present invention is also user friendly, as it does not require users to hold the phone at a specific angle, thereby ensuring convenient use of the phone. Also, the support structure offers an easy way of facilitating multitasking while using the phone.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a phone "throne" stand designed to hold a tablet or smart phone in an easily viewable position comprising: one-piece body of wood, metal or plastic having a taller rear portion including a rear wall; a pair of parallel surfaces and two front legs, wherein each front leg has a plurality of angular holding slots cut at different angles to support the smartphone; an inclined middle portion to support the rear surface of the smartphone; and a longitudinal support surface taller than the inclined middle portion and similar in height to the rear wall to further support the rear surface of the smartphone. A first placement space is positioned between the rear wall and the longitudinal support surface, and a second placement space is positioned between the longitudinal support surface and the inclined middle portion to provide at least two areas to hold the tablet or the smartphone along one of its longitudinal side surfaces.

In a further embodiment of the present invention, a novel phone stand, to hold an electronic device such as a smartphone, is disclosed and comprises: a bottom rubber or silicon portion on which the novel phone stand is placed on a surface; a taller rear portion having an inclined surface and a lower front portion having two legs, wherein each leg including a plurality of holding slots cut at different angles to place the electronic device at different angles; and wherein the taller rear portion supports the rear surface of the electronic device. The bottom rubber or silicon portion provides friction to a surface below thereby preventing slippage. The bottom surface can also include magnets to provide an attachment mechanism between the phone stand and a metal surface mounted thereto.

The advantage of the novel phone "throne" stand device of the present invention is that it enables the user to rest the phone/tablet in the desired position at the desired angle. The device can be placed on any surface and is provided with a non-slip bottom surface. The mobile phone can be kept at an ideal angle for hands free viewing. The device allows a way for users to see their home screen from any angle to look for messages, emails and other alerts. The phone can be kept in both vertical (i.e. portrait) and horizontal (i.e. landscape) positions for convenient placement.

The device holds a smartphone or tablet at a comfortable angle that is ideal for watching video, reading, video recording or simply browsing the web, playing games, and other hands-free operation at home, the office and during travel. The device works with all smartphones, mini tablets and tablets generally in the range of three to about ten inches in width, and about three to about ten inches in length. The angles in which the electronic device can be placed are generally from about 30 degrees to about 70 degrees from horizontal.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
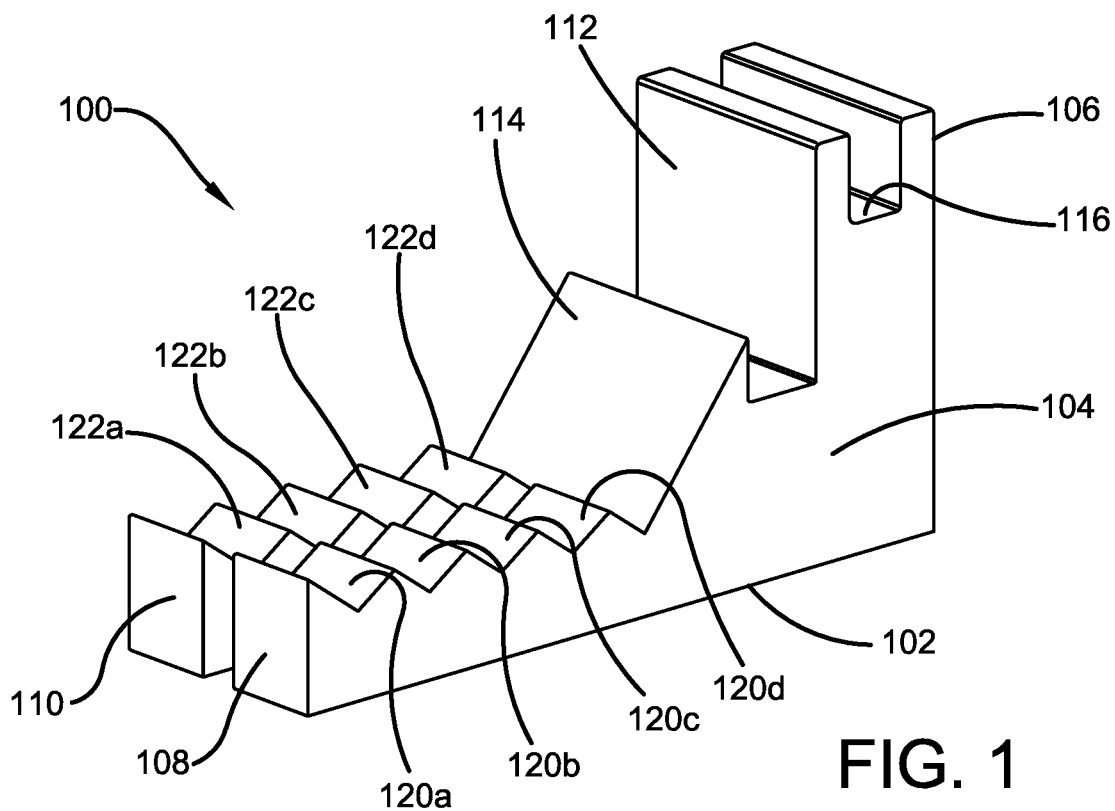
FIG. 1 illustrates a perspective view of one potential embodiment of the novel phone stand of the present invention to hold a tablet or smart phone in an easily viewed position in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a support structure for supporting and holding phones. There is also a long felt need in the art for a support structure that enables a mobile phone to be kept at a desired angle while using the phone. Additionally, there is a long felt need in the art for a phone stand that eliminates the need for the users to hold their phones while using the phone for various purposes such as video chatting, video conferencing, internet surfing or other purposes. Moreover, there is a long felt need in the art for a phone support structure that keeps the phone at a desired angle which retains the camera centered on the user, thereby enabling the user to be viewed by others while video conferencing or video chatting. Further, there is a long felt need in the art for a support structure for manually holding phones, thereby eliminating the need to hold the phone for long periods of time. Furthermore, there is a long felt need in the art for a phone stand that makes it easy to use the phones by elderly individuals and people with limited physical dexterity. There is a long felt need in the art for a phone support structure that allows users to easily utilize their phones for different purposes while the phone is plugged in for charging. Finally, there is a long felt need in the art for a phone support structure that enables the phone to be retained on the stand, thereby allowing multitasking.

The present invention, in one exemplary embodiment, is a novel phone "throne" stand designed to hold a tablet or smart phone in an easily viewable position comprising a one-piece body of wood, metal or plastic having a taller rear portion including a rear wall, a pair of parallel surfaces and two front legs, wherein each front leg has a plurality of angular holding slots cut at different angles to support the smartphone, an inclined middle portion to support a rear side of the smartphone, and a longitudinal support surface taller than the inclined middle portion and similar in height to the rear wall to further support the rear side of the smartphone. A first placement space is positioned between the rear wall and the longitudinal support surface and a second placement space is positioned between the longitudinal support surface and the inclined middle portion are present to hold the tablet or the smartphone along one of the longitudinal side surfaces of the device.

Referring initially to the drawings, FIG. 1 illustrates a perspective view of a novel phone stand of the present invention to hold a tablet or smart phone in an easily viewed position in accordance with the disclosed architecture. As shown, the phone stand 100 can comprise a one piece construction device having a plurality of slots to position an electronic device, such as a smartphone, in different positions as per the requirements and desires of a user. The phone stand 100 has a base 102 on which the phone stand 100 is secured to a surface therebelow. A first side surface 104, a second side surface (not shown) parallel to the first side surface 104 and a rear surface 106 form the three sides of the phone stand 100. The phone stand 100 comprises a lower portion having two front legs 108, 110 that are substantially similar in height and width. To place an electronic device at different angles, the first front leg 108 has a plurality of first angular holding slots 120a, 120b, 120c, 120d to support the electronic device at an angle. Similarly, the second front leg 110 has a plurality of second angular holding slots 122a, 122b, 122c, 122d to support the electronic device at an angle. The shapes and angles of all the angular holding slots 120, 122 are constructed to be similar in size and orientation to assist in secure placement of the electronic device. The front legs 108, 110 form the lower and front mounting portion of the phone stand 100.

To support the rear surface of the electronic device, an inclined middle portion or middle surface 114 having an angular inclination similar to the angular inclination of the holding slots 120, 122 is present to give support to the rear surface of the electronic device. It should be noted that the first angular holding slots 120a, 120b, 120c, 120d are generally parallel to each other and are generally parallel to the inclined middle surface 114. Similarly, the second angular holding slots 122a, 122b, 122c, 122d are generally parallel to each other and are generally parallel to the inclined middle surface 114. The number of first angular holding slots 120 can be equal to the number of second angular holding slots 122. Each first angular slot 120a, 120b, 120c, 120d can be laterally aligned to each respective second angular slot 122a, 122b, 122c, 122d.

To further support electronic devices of bigger sizes and larger height, a longitudinal upper portion support surface 112 is present that is parallel to the rear surface 106 and is designed to give further support to the rear surface of the electronic device. The electronic device can be longitudinally positioned via its bottom surface in the space between any two consecutive first angular holding slots 120a, 120b, 120c, 120d and in the space between the respective laterally aligned second angular slots 122a, 122b, 122c, 122d. The lower portion of the rear surface of the electronic device is supported by the first angular holding slots and the second angular slots. The electronic device is declined at the angle of the first angular and second angular holding slots and is supported on the back side by the inclined middle surface 114. Further, the upper section of the electronic device is supported by the longitudinal support surface 112 to give a stable and selectively fixed position to the electronic device.

There is a first placement space or longitudinal mounting groove 116 present between the rear wall 106 and the longitudinal support surface 112. The space 116 comprises a slot, groove or carved-out region and is bordered by the rear wall 106 and the longitudinal support surface 112. The first placement space 116 can support an electronic device placed on one of its longitudinal side surfaces (not illustrated). The depth of the placement space 116 can be generally from about ½ inch to about 2 inches, and the width of the space 116 can be generally from about 1 inch to about 4 inches.

A second placement space or longitudinal mounting groove 118 is present between the longitudinal support surface 112 and the inclined middle surface 114 to place an electronic device on one of its longitudinal side surfaces. The second placement space 118 can support an electronic device placed on one of its longitudinal side surfaces (not illustrated). The depth of the placement space 118 can be generally from about ½ inch to about 2 inches, and the width of the space can be generally from about 1 inch to about 4 inches. It should be noted that the rear wall 106 and longitudinal support surface 112 are similar in height and the rear wall 106 is taller than the front portions and the inclined middle surface 114.

The first angular holding slots 120a, 120b, 120c, 120d and the second angular holding slots 122a, 122b, 122c, 122d are designed to keep the phone, or any other electronic device, at different angles for hands free viewing. The phone stand 100 enables users to video conference with others without the need to manually hold their phone, and provides a way for users to see their home screen from any angle to look at messages, emails and other alerts.

The phone stand 100 can be made from wood, metal, plastic, fiberglass or any other durable material. The phone stand 100 can comprise a one-piece body or component with no modular or extraneous pieces and can comprise a design that is carved or machined from a single unit of wood, metal, plastic, or any other durable material. The outer surface can have any logo or design thereon to increase the aesthetic appeal of the phone stand 100. In one embodiment, the height of the rear wall 106 and the longitudinal support surface 112 can be in the range from about 4 inches to about 10 inches. The height of the inclined middle surface 114 can be in the range from about 1 inch to about 4 inches, and the height of the angular holding slots can be in the range from about 0.5 inches to about 2.5 inches. The length of the side surface 104 can be in the range from about 4 inches to about 12 inches.

In one embodiment, the first angular holding slots 120a, 120b, 120c, 120d and the second angular holding slots 122a, 122b, 122c, 122d can include any number of combinations from one to six in number and can have angles in the range of seventy degrees to about thirty degrees from the horizontal surface.

Figure 2:
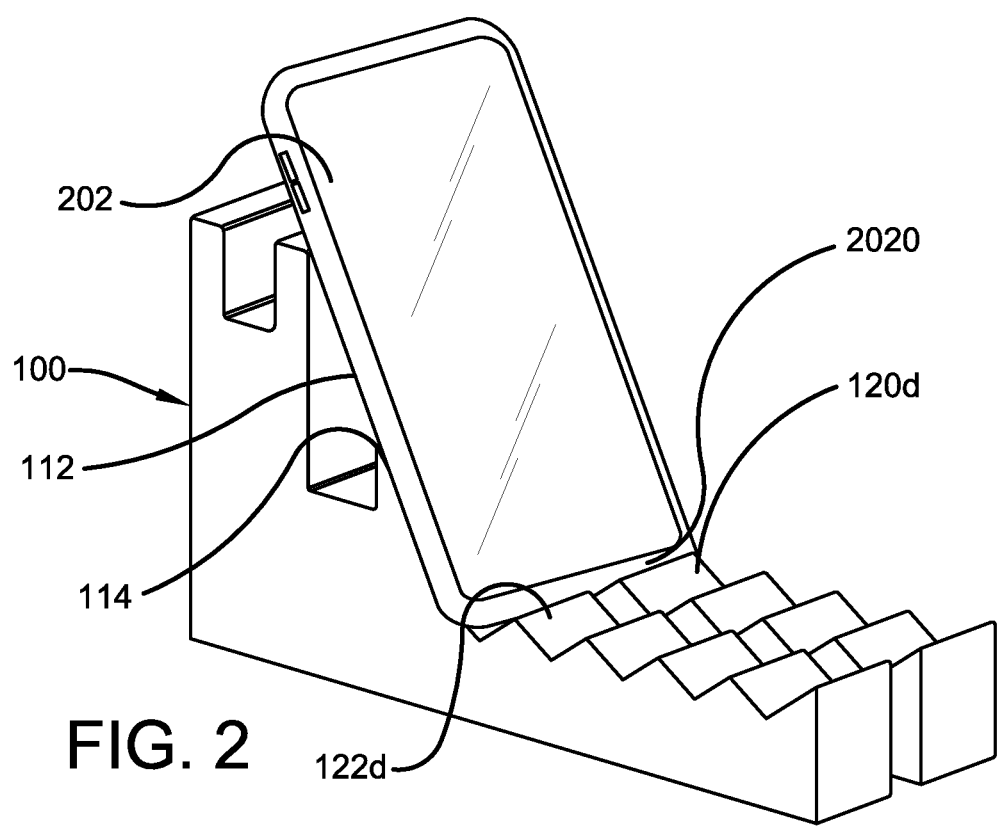
FIG. 2 illustrates a perspective view of one potential embodiment of a smartphone placed at a desired angle on the novel phone stand of the present invention in accordance with the disclosed architecture.

FIG. 2 illustrates a perspective view of a smartphone placed at a desired angle on the novel phone stand of the present invention in accordance with the disclosed architecture. As shown, a smartphone 202 is placed on the phone stand 100 with the bottom surface 202O of the smartphone 202 placed in the slot between the angular holding slot 120d, the inclined middle surface 114, the slot between the second angular holding slot 122d and the inclined middle surface 114. The rear surface of the smartphone 202 is supported by the inclined middle surface 114 and the longitudinal support surface 112. To change the angle of the smartphone 202, the bottom surface 202b of the smartphone 202, can be placed between slots of any other first angular holding slots 120a, 120b, 120c and any other second angular holding slots 122a, 122b, 122c.

Figure 3:
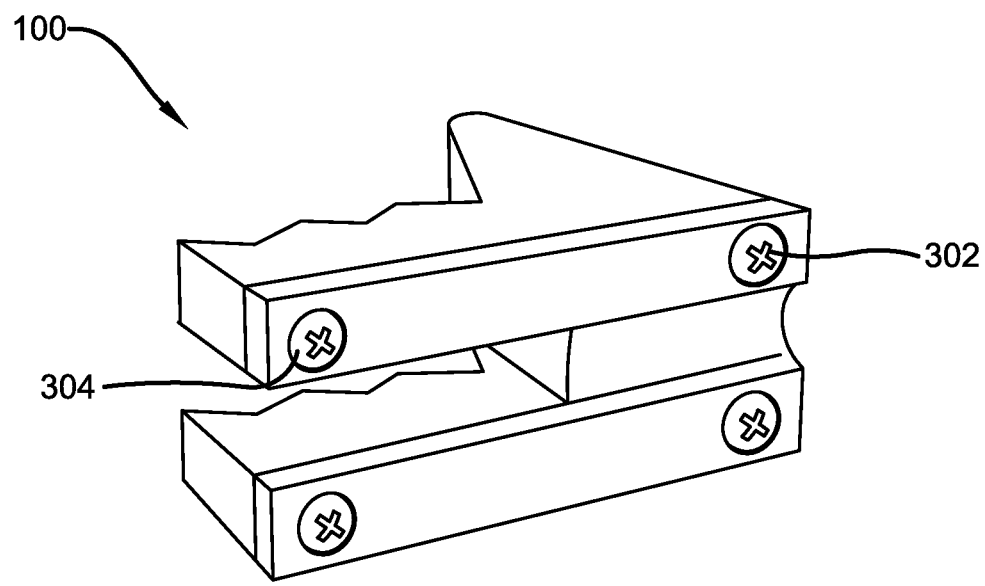
FIG. 3 illustrates a bottom perspective view of one potential embodiment of the novel phone "throne" stand of the present invention in accordance with the disclosed architecture.

FIG. 3 illustrates a bottom perspective view of the novel phone "throne" stand of the present invention in accordance with the disclosed architecture. The bottom surface 302 of the phone stand 100 comprises a non-slip material or a layer of such non-slip material that prevents sliding or slipping of the phone stand 100 even on a smooth surface such as a table or a stand. The material can be a thin rubber, silicon, or any other similar anti-slipping material. In addition, the bottom surface 302 may also comprise screws or magnets 304 that can be used to further secure placement of the phone "throne" stand 100 on a non-horizontal surface. The material of the phone stand can comprise sufficient weight such that the phone stand 100 resists movement and tipping from incidental contact made thereto. An open space 308 between the two front legs 108, 110, along with a channel 310, allows a user to charge the phone or connect earphones in the charging/headphone jack 203d (refer to FIG. 4) for increased utility and convenience. It is to be appreciated that the channel 310 and open space 308 provide an avenue to pass a cord therethrough while the stand 100 is retained in a coplanar orientation with a horizontal surface.

Figure 4:
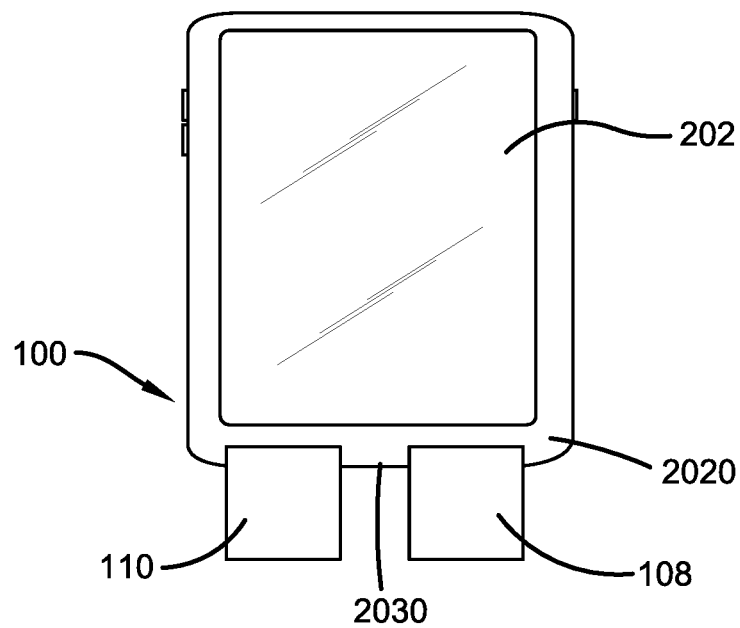
FIG. 4 illustrates a front perspective view of one potential embodiment of the novel phone "throne" stand of the present invention supporting a smartphone in accordance with the disclosed architecture.

FIG. 4 illustrates a front perspective view of the novel phone "throne" stand of the present invention supporting a smartphone in accordance with the disclosed architecture. As shown, the smartphone 202, or any other similar electronic device, can be placed with its bottom surface 202b positioned in the nearest first angular holding slot 120a and the nearest second angular holding slot 122a to position the phone 202 selectively in its lowest or most shallow angle relative to horizontal. The position shown in FIG. 4, for example, can be selected to keep the phone secured when the phone is not actively being viewed.

Figure 5:
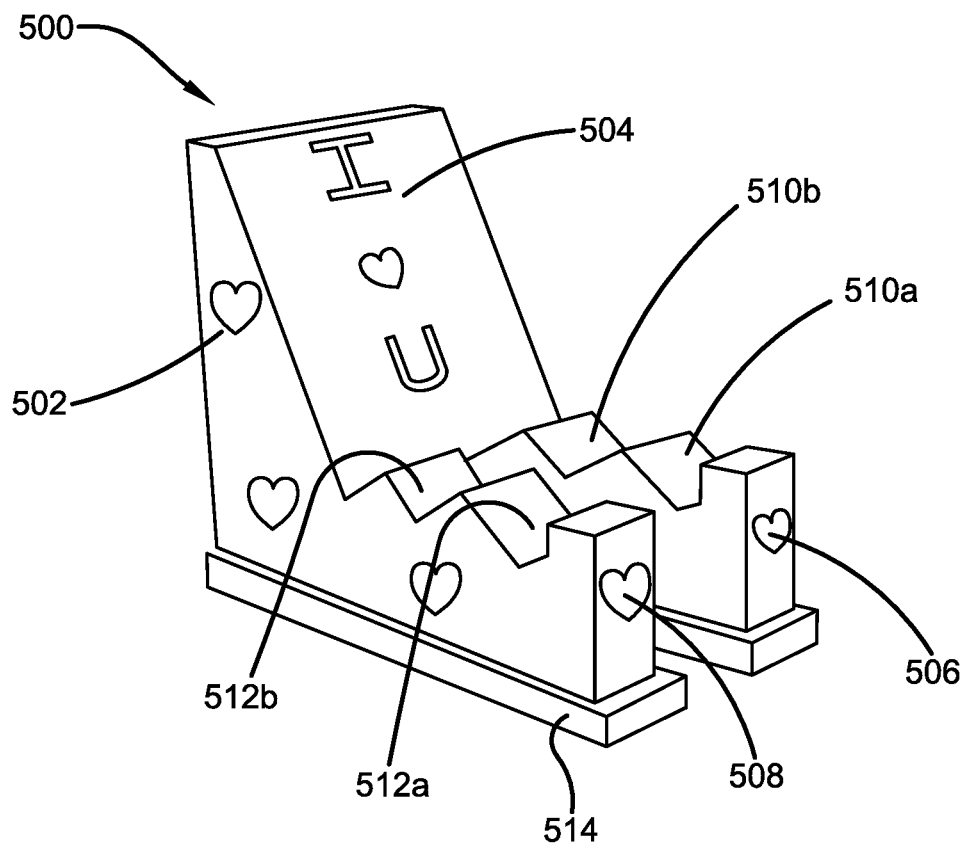
FIG. 5 illustrates another embodiment of the electronic device 'throne' stand of the present invention in accordance with the disclosed architecture.

FIG. 5 illustrates another embodiment of the electronic device "throne" stand of the present invention in accordance with the disclosed architecture. As shown, the phone stand 500 comprises two first angular holding slots 510a, 510b on the first leg 506, and two second angular holding slots 512a, 512b on the second leg 508. A taller inclined member 504 is present to further support an electronic device placed on the phone stand 500.

The base 514 can comprise thick rubber or silicone to increase the weight at the bottom of the device 500 in order to prevent slippage. The surface of the phone stand 500 may have any logo, design or trademark displayed thereon and/or can be customized to include any other name or company information. The electronic device "throne" stand 100 can be sold with an electronic device as an accessory or also as an after-market product. The phone stand 100 is durable, compact and capable of supporting smartphones, tablets, or other electronic devices such as power banks of various sizes and dimensions.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "phone throne stand", "phone stand", "electronic device throne stand", and "electronic device stand", are interchangeable and refer to the phone throne stand 100, 500 of the present invention.

Notwithstanding the forgoing, the phone "throne" stand 100, 500 and its components of the present invention can be of any suitable size and configuration as is known in the art without affecting the overall concept of the invention, provided that it accomplishes the above-stated objectives. One of ordinary skill in the art will appreciate that the size, configuration, and material of the phone "throne" stand 100, 500 as shown in the FIGS. are for illustrative purposes only, and that many other sizes and shapes of the phone "throne" stand 100, 500 are well within the scope of the present disclosure. Although the dimensions of the phone "throne" stand 100, 500 are important design parameters for user convenience, the phone "throne" stand 100, 500 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A stand configured to provide a mount for a portable electronic device, the stand comprising:
  a base comprising a channel thereunder;
  an upper portion, wherein said upper portion comprises a generally vertical support wall extending upward from said base for providing support to an upper section of the electronic device;
  a middle portion, wherein said middle portion comprises an inclined support wall extending at an angle relative to said base for providing support to a middle section of the electronic device;
  a lower portion, wherein said lower portion comprises a plurality of mounting slots for providing selective angles of support to a lower section of the electronic device;
  said plurality of mounting slots comprises at least two pairs of laterally aligned mounting slots including a space between corresponding pairs of said plurality of mounting slots; and
  said channel and said space comprise an opening for a cord to pass therethrough and connect to the electronic device.

2. The stand of claim 1, wherein said plurality of mounting slots comprises at least four pairs of laterally aligned mounting slots including said space between corresponding pairs of said plurality of mounting slots.

3. The stand of claim 2, wherein both said upper portion and said middle portion are fixed in respective positions.

4. The stand of claim 3, wherein a first pair of said plurality of mounting slots aligns with said middle portion and said upper portion for mounting of the electronic device generally at an angle of about 30 degrees from horizontal.

5. The stand of claim 4, wherein at least a second pair of said plurality of mounting slots aligns with said middle portion and said upper portion for mounting of the electronic device generally at an angle of about 70 degrees from horizontal.

6. The stand of claim 5, wherein a height of said upper portion is at least twice a height of said middle portion, and said height of said middle portion is at least twice a height of said lower portion.

7. The stand of claim 6, wherein said base comprises a length generally about 4 inches to about 12 inches.

8. The stand of claim 7, wherein said length of said base is greater than said height of said upper portion.

9. The stand of claim 8, wherein said stand material is selected from a group consisting of a wood, a metal, a plastic and a fiberglass.

10. A stand configured to provide a mount for a portable electronic device, the stand comprising:
   a base;
   an upper portion, wherein said upper portion comprises a first generally vertical support wall extending upward from said base and a second generally vertical support wall for providing support to an upper section of the electronic device;
   said first vertical support and said second vertical support comprise a first longitudinal groove therebetween;
   a middle portion, wherein said middle portion comprises an inclined support wall extending at an angle relative to said base for providing support to a middle section of the electronic device;
   a lower portion, wherein said lower portion comprises a first leg and a second leg including a space therebetween;
   said first leg and said second leg each comprising a plurality of laterally aligned mounting slots for providing selective angles of support to a lower section of the electronic device; and
   said plurality of mounting slots comprises at least three pairs of laterally aligned mounting slots including said space between corresponding pairs of said plurality of mounting slots.

11. The stand of claim 10, wherein said base comprises a channel thereunder; and
   said channel and said space comprise an opening for a cord to pass therethrough and connect to the electronic device.

12. The stand of claim 11, wherein both said upper portion and said middle portion are fixed in respective positions.

13. The stand of claim 12, wherein a first pair of said plurality of mounting slots aligns with said middle portion and said upper portion for mounting of the electronic device generally at an angle of about 30 degrees from horizontal.

14. The stand of claim 13, wherein at least a second pair of said plurality of mounting slots aligns with said middle portion and said upper portion for mounting of the electronic device generally at an angle of about 70 degrees from horizontal.

15. The stand of claim 14, wherein a height of said upper portion is at least twice a height of said middle portion, and said height of said middle portion is at least twice a height of said lower portion.

16. The stand of claim 15, wherein said base comprises a length generally about 4 inches to about 12 inches.

17. The stand of claim 16, wherein said length of said base is greater than said height of said upper portion.

18. The stand of claim 17, wherein said first longitudinal groove comprises a depth generally about 0.5 inches to about 2 inches and a width generally about 1 inch to about 4 inches for positioning the electronic device in a first longitudinal orientation therein.

19. The stand of claim 18, wherein said upper portion and said middle portion comprise a second longitudinal groove therebetween; and
   said second longitudinal groove comprises a depth generally about 0.5 inches to about 2 inches and a width generally about 1 inch to about 4 inches for positioning the electronic device in a second longitudinal orientation therein.

20. The stand of claim 19, wherein said stand comprises one piece construction and includes material selected from a group consisting of a wood, a metal, a plastic and a fiberglass.

\* \* \* \* \*